United States Patent [19]

Treadwell

[11] 4,072,884
[45] Feb. 7, 1978

[54] BRUSHLESS PHASE LOCKED SERVO DRIVE

[75] Inventor: Richard Julian Treadwell, Belle Mead, N.J.

[73] Assignee: RCA Corporation, New York, N.Y.

[21] Appl. No.: 659,267

[22] Filed: Feb. 19, 1976

[30] Foreign Application Priority Data

Mar. 25, 1975 United Kingdom ............... 12395/75

[51] Int. Cl.² ............................................. H02P 5/00
[52] U.S. Cl. .................................... 318/314; 318/608; 318/439
[58] Field of Search ............... 318/314, 318, 606, 608, 318/439

[56] References Cited

U.S. PATENT DOCUMENTS

| | | | |
|---|---|---|---|
| 3,050,668 | 8/1962 | Pease et al. | 318/608 |
| 3,359,499 | 12/1967 | McDonough | 318/608 |
| 3,395,326 | 7/1968 | Hebb | 318/318 |
| 3,423,523 | 1/1969 | Kosugi et al. | 318/314 |
| 3,462,663 | 8/1969 | Schiller | 318/608 |
| 3,495,152 | 2/1970 | Keiser et al. | 318/314 |
| 3,828,234 | 8/1974 | Goldberg | 318/314 |
| 3,839,665 | 10/1974 | Gabor | 318/608 |

Primary Examiner—Robert K. Schaefer
Assistant Examiner—Eugene S. Indyk
Attorney, Agent, or Firm—Joseph D. Lazar; H. Christoffersen; Edward J. Norton

[57] ABSTRACT

The speed and direction of rotation of an electronically commutated brushless D.C. motor is controlled by utilizing a resolver to provide both phase locked servo feedback and motor commutation. The resolver in response to orthogonal signal voltages on its primary coils, provides a signal whose phase is a function of the motor shaft angle. A phase detector provides a signal whose phase varies in accordance with the difference between the phase of the signal from the resolver and the phase of a reference signal. The reference signal phase varies in a predetermined manner as a function of time dependent upon the desired shaft speed and direction of rotation. The phase detector output signal is then used to amplitude modulate the signal from the resolver. The amplitude modulated signal is then demodulated with respect to the orthogonal signal voltages so as to provide signals to energize the control coils of the motor.

9 Claims, 3 Drawing Figures

BRUSHLESS PHASE LOCKED SERVO DRIVE

BACKGROUND OF THE INVENTION

1. Field of the Invention

This invention relates to an improved motor speed control system and more particularly to a motor speed control system for an electronically commutated brushless D.C. motor having bi-directional multi-speed control and a resolver which provides both phase-locked servo feedback and motor commutation.

2. Description of the Prior Art

There are many applications where precise control of electric motor speed is necessary.

In an orbiting spacecraft, for example, where solar arrays are utilized to convert solar energy into electrical energy it is necessary to rotate the array during the spacecraft's orbit so as to obtain optimum exposure to solar energy. For a spacecraft in a geo-stationary orbit, the solar array shaft is rotated such that it completes one revolution in each 24 hour period. Therefore, it becomes necessary to provide a motor speed control system which is able to control angular shaft position with precision at extremely slow motor speeds.

One system for controlling motor speed is described in U.S. Pat. No. 3,828,234 issued on Aug. 6, 1974, to RCA Corporation, based on the invention of Edwin Goldberg entitled "Motor Speed Control System." The system described therein achieves control by using an error signal voltage which is a function of the phase difference between the output voltages of a resolver and a suitable phase shifting circuit. The error signal voltage is then amplified and compensated by suitable motor electronics. The motor electronics output signal is then used to energize the motor and thereby turn the motor shaft until the magnitude of the error signal voltage is either nulled or decreased to some predetermined value.

According to the present invention, an improved bi-directional multi-speed motor speed control system is described wherein a resolver provides both phase locked servo feedback and motor commutation for an electronically commutated brushless D.C. motor.

Summary of the Invention

A system is provided for controlling the rate and direction of rotation of a motor shaft from a reference signal souce. Phase splitter means responsive to the reference signal provide output signals which are coupled to means responsive to the angular movement of the motor to provide a first signal whose phase is a function of the shaft angle. Phase shifting means also responsive to the reference signal and a plurality of control signals provides a second signal whose phase is a function of desired shaft speed and direction of rotation. The control signals are indicative of shaft speed and direction of rotation. Phase detection means responsive to the output of the phase shifting means and the first signal provides a further signal in accordance with the phase difference therebetween. Modulation means responsive to the phase detection means output signal and the resolver means output signal provides an output signal whose amplitude varies as a function of the phase detection means output signals. Demodulation means responsive to the modulation means output signal and the phase splitter means output signals, provide output signals which are applied to the brushless D.C. motor to control direction and speed of rotation.

DETAILED DESCRIPTION OF THE PREFERRED EMBODIMENT

Figure 1:
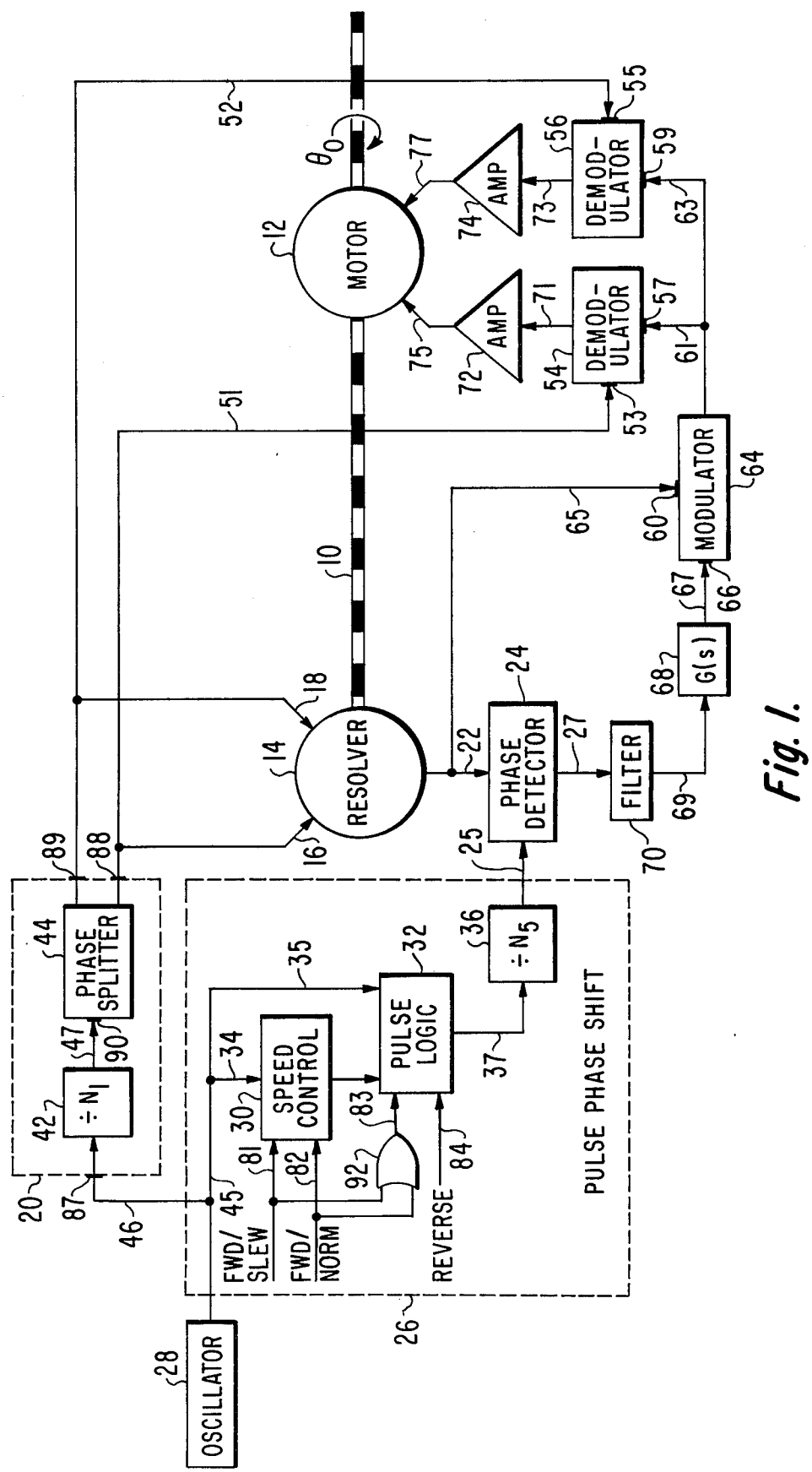
FIG. 1 is a block diagram of an improved motor control system illustrating one embodiment of the invention.

Referring to FIG. 1, there is shown a block diagram of a motor control system of the present invention. Ground connections and power supplies and multiple leads coupling the circuit components are not shown but will be readily provided in a manner understood by those skilled in the art.

A brushless D.C. motor 12 drives a suitable resolver 14 which has primary and secondary coils, not shown, and which generates an electrical signal over path 22 indicative of the angular position of motor shaft 10. Shaft 10 of motor 12 is mechanically directly coupled to resolver 14 so that the secondary coils of resolver 14 rotate at the same speed as motor shaft 10. The primary coils of resolver 14 are excited by orthogonal voltage signals transmitted to resolver 14 along conductive paths 16 and 18 from a two phase drive system 20. Two phase drive system 20 comprising a phase splitter 44 and divider 42 is arranged to convert an input electrical signal from oscillator 28 to the orthogonal voltage signals used to excite the primary coils of resolver 14. A voltage signal is induced across the secondary coils of resolver 14 due to the excitation of the resolver primary coils. Resolver 14 is employed inversely of its conventional or normal usage in that the secondary coils which are normally the excitation windings are used as the output windings whereas the primary coils which are normally the sine/cosine output windings are used as the input windings. The resolver secondary voltage is transmitted along conductive path 22 to phase detector circuit 24. The frequency of the resolver secondary voltage signal coupled to phase detector circuit 24 is the arithmetic sum of the frequency of the signals exciting the primary coils of resolver 14 and a multiple of the number of revolutions per unit of time of the motor shaft. The phase or the resolver secondary voltage signal is a function of the angular position of shaft 10 and the number of poles, P, not shown, or resolver 14 and is referenced to the phase of one of the primary coil excitation voltage signals transmitted by two phase drive system 20.

Phase detector circuit 24 receives the secondary voltage of resolver 14 and compares it in phase with a reference output voltage transmitted from phase shifting circuit 26 along conductive path 25. Pulse phase shifting circuit 26 comprised of speed control logic 30 and pulse logic 32 is arranged to convert a reference input electrical signal from oscillator 28 to a reference output voltage on path 25 having a phase which varies in a predetermined manner as a function of time. Speed control logic 30 shown in more detail in FIG. 2, to be described later, operates in response to signal voltages on paths 81, 82 representing motor shaft speed.

Typically, the motor shaft may be driven at either normal or a slew speed. Slewing of the motor shaft is useful where it is necessary to rotate the shaft in either the reverse or forward direction at a high speed. Such a condition may occur, for example, during initial alignment of the shaft with a fixed reference or datum. Pulse logic 32 also shown in more detail in FIG. 2 operates in response to signal voltages on paths 83, 84 representing respectively forward or reverse motor shaft direction of rotation.

As will be described in detail below, the variation of the phase of the output voltage from shifting circuit 26 is a function of both the required motor shaft direction and speed of rotation. In brief, the desired direction of shaft rotation causes pulses to be periodically added or deleted from the reference output electrical signal of oscillator 28 whereas the speed of shaft rotation determines the rate at which such pulses are to be added or deleted. In order to force the motor to run at a predetermined rate, it is necessary to shift continuously the phase of the output voltage from shifting circuit 26 relative to the reference voltage phase on conductive path 16. The periodic addition or deletion of pulses from the output signal of oscillator 28 continuously shifts the phase of the output voltage from shifting circuit 26. The deletion of pulses causes the phase of the oscillator signal 28 to be retarded relative to the phase of the reference signal 16 whereas the addition of pulses causes the phase of signal 28 to be advanced relative to the phase of signal 16. The amount by which the phase of signal 28 is either retarded or advanced relative to the phase of signal 16, is determined by the rate at which pulses are deleted or added respectively from the output signal of oscillator 28.

The phase comparison provided by phase detector circuit 24 results in an error signal voltage (27) that is a function of the phase difference between the resolver secondary voltage (22) and the reference output voltage from pulse phase shifting circuit 26. The phase of the reference output voltage from pulse phase shifting circuit 26 transmitted along conductive path 25 is not constant, as is usual in prior art circuits but varies in a predetermined manner as a function of time.

The phase detector error signal voltage is transmitted along conductive path 27 to low pass filter 70. The error signal voltage from phase detector 24 is substantially a rectangular wave with an on/off ratio equal to the phase difference between the resolver secondary voltage and the reference output voltage from shifting circuit 26. Filter 70 removes the frequency component of the phase detector error signal voltage to produce a D.C. voltage whose amplitude is proportional to the phase difference between the phase of the resolver secondary voltage and the phase of the output voltage from shifting circuit 26. The output voltage of filter 70 is transmitted along conducting path 69 to shaping network 68.

Shaping network 68 of conventional design has a transfer function G(S) which provides a combination of phase leads and phase lags at various frequencies. The purpose of the transfer function is to achieve accurate, stable and optimum response of the phase locked servo in the presence of noise and other perturbations and disturbances. The transfer function, G(S), represents the ratio of the output voltage to the input voltage for shaping network 68. In an orbiting spacecraft where, for example, motor 12 may be used to rotate the shaft of either solar arrays or antennae, noise and/or other perturbations unless properly controlled could adversely affect spacecraft attitude. Thus, shaping network 68 shapes the frequency response of the motor control system so as to obtain optimum phase locked servo behavior. The shaping provided by network 68 results in a D.C. voltage which is proportional to the product of the transfer function, G(S) of network 68 and the difference in phase between the resolver secondary voltage and the reference output voltage from shifting circuit 26.

The voltage developed by shaper 68 is transmitted along conductive path 67 to input 66 of amplitude modulator 64 where it is used to amplitude modulate the secondary voltage of resolver 14. Resolver secondary voltage is transmitted along conductive path 65 to input 60 of modulator 64. Modulator 64 is arranged to provide at its output, an amplitude modulated voltage whose amplitude varies in accordance with the signal voltage developed at the output of phase detector 24. Therefore, the output voltage of modulator 64 is a sinusoidal waveform which is at the same frequency and phase as the resolver 14 secondary voltage and whose amplitude varies in time as a function of the phase difference between the resolver secondary voltage and the reference output voltage from shifting circuit 26, multiplied by the transfer function, G(S) of shaping network 68.

The output signal of modulator 64 is transmitted along conductive paths 61 and 63 to the input terminals 57 and 59 of demodulators 54 and 56, respectively. The orthogonal voltage signals from two phase drive circuit 20 are coupled along conductive paths 51, 52 to input terminals 53 and 55 of demodulators 54 and 56, respectively. Thus, the modulated voltage signal from modulator 64 is demodulated by demodulators 54 and 56 with respect to the orthogonal voltage signals from two phase drive system 20. This demodulation generates two D.C. voltages $V_{sin}$ and $V_{cos}$ represented by the following equations:

$$V_{sin} \simeq G(S) \, (\theta_i - [\frac{P_R}{2} \, \theta_0]) \sin \frac{P_R}{2} \theta_0 \quad (1)$$

$$V_{cos} \simeq G(S) \, (\theta_i - [\frac{P_R}{2} \, \theta_0]) \cos \frac{P_R}{2} \theta_0 \quad (2)$$

where G(S) is the transfer function of shaper 68, $\theta_i$ is the phase of the reference output voltage from phase shifter network 26, $\theta_0$ is the phase of the resolver shaft related to a datum or reference and $P_R$ is the number of poles of resolver 14. The D.C. voltages $V_{sin}$ and $V_{cos}$ developed by demodulators 54 and 56 are, after amplification by class A, D.C. amplifiers 72 and 74, respectively, transmitted along conductive paths 75 and 77 to their respective motor windings. The energizing of the windings of motor 12 in turn drives resolver 14 in a direction phase by an amount necessary to shift the phse of the resolver secondary voltage until it equals a predetermined phase relative to the phase of the reference output voltage from phase shifting network 26.

It will thus be appreciated that the signal on path 67 is a dc signal whose amplitude is proportional to the phase difference between the respective phases of the voltages on paths 22 and 25. This dc voltage on path 67 is the dc form of the servo error signal. Further, the voltage on path 65 is an ac signal of constant amplitude and of a phase, relative to the phase of the ac voltage on path 88, proportional to the mechanical angle of rotation of the resolver from a referenced position. The phase of the orthogonal ac voltage on path 89, it is noted, is fixed at 90° (lag or lead) relative to the phase of the signal on path 88.

Figure 3:
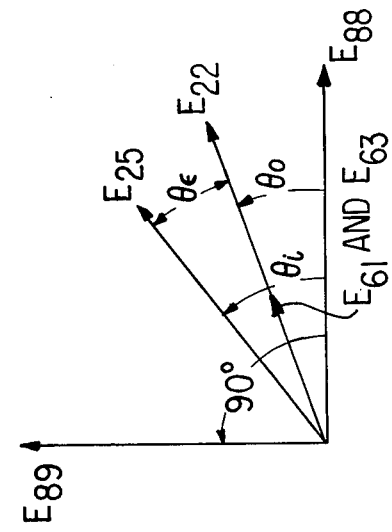
FIG. 3 is a vector diagram of several of the ac voltages in the servo loop.

The vector relationships of the ac signal voltages in the servo loop are illustrated in FIG. 3. The numbered subscripts to the ac voltages "E" represent the path or terminal at which the voltage exists in the servo loop illustrated in FIG. 1. The relationship of these voltages will be readily apparent from the description given hereinabove. The phase angles $\theta_0$ and $\theta_i$ are as defined and used in equations (1) and (2). The phase angle $\theta_\epsilon$ is the error in phase detected by detector 27 between the ac voltages on paths 25 and 27.

Brushless D.C. motor 12 has two windings such that a current $I_{sin}$ in one winding produces a torque, $T_s$, determined by the equation:

$$T_s = K I_{sin} \sin P_m/2 \, \theta_m \quad (3)$$

while a current $I_{cos}$ in the other winding produces a torque $T_c$, determined by the equation:

$$T_c = K I_{cos} \cos P_m/2 \, \theta_m \quad (4)$$

where K is a constant of proportionality, $P_m$ are the number of poles in motor 12 and $\theta_m$ is the angle of the shaft of motor 12.

The motor currents $I_{sin}$ and $I_{cos}$ are determined by the equations:

$$I_{sin} = \frac{1}{(\tau_e S + 1)} \frac{V_{sin}}{R} \quad (5)$$

$$I_{cos} = \frac{1}{(\tau_e S + 1)} \frac{V_{cos}}{R} \quad (6)$$

where $\tau_e$ is the motor electrical time constant, R, is the motor resistance, s is the Laplacian operator and $V_{sin}$ and $V_{cos}$ are the output voltages from amplifiers 72 and 74, respectively. Substitution of equations 1 and 5 into equation 3 and substitution of equations 2 and 6 into equation 4 yields the expression for the motor torque, T, which is the sum of $T_s$ and $T_c$ and is determined by equation (7) as follows:

$$T = \frac{K\,G(S)\,(\theta_i - \theta_0)}{(\tau_e S + 1)\,R} \sin^2 \frac{P\,\theta_0}{Z} + \frac{K\,G(S)\,(\theta_i - \theta_0)}{(\tau_e S + 1)\,R} \cos^2 \frac{P\,\theta_0}{Z}$$

where $P_m = P_R = P$ and $\theta_m = \theta_0$. The trigonometric terms in the above expression can be eliminated so that the motor torque, T, is given by the relationship:

$$T = \frac{K\,G(S)\,(\theta_i - \theta_0)}{(\tau_e S + 1)R} \quad (8)$$

The motor torque is applied in a sense that will null the difference between $\theta_0$ and $\theta_i$. Motor 12 is forced to operate and turn shaft 10 at a rate determined by the rate at which the phase of the phase shifter output signal on conductor path 25 is varying relative to the phase of the phase splitter output signal on conductive path 16. By incrementally changing the phase of the reference voltage from phase shifting network 26 as a function of time, the motor must correspondingly turn shaft 10 and drive resolver 14 until the magnitude of the error signal voltage is nulled, or until the phase of the resolver secondary voltage equals a predetermined phase relative to the phase of the phase shifter output signal on conductive path 25.

Thus, according to the present invention, the resolver output voltage is used through phase detector 24, as a measure of shaft position and also through modulator 64 for the purposes of commutating the current in the windings of brushless D.C. motor 12.

Figure 2:
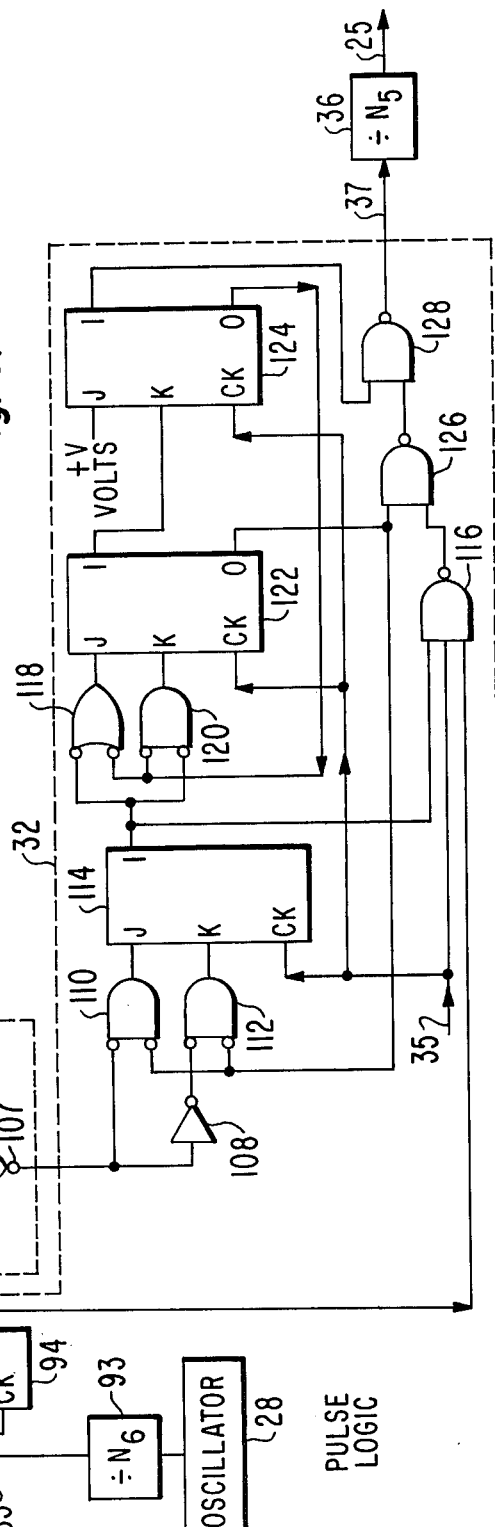
FIG. 2 is a schematic of a preferred pulse phase shifting circuit useful in the control system of FIG. 1.

Referring to FIG. 2 there is shown a detailed circuit diagram of the pulse shifting phase circuit 26 of FIG. 1. The speed control logic 30 is comprised of J/K flip-flop 90, dividers 98, 102, 104, and associated logic elements 92, 96, 100, and 106, whereas the pulse logic 32 is comprised of J/K flip-flops 94, 114, 122, and 124, and associated logic elements as shown in FIG. 2.

J/K flip-flop 90 of speed control circuit 30 is used to indicate the desired speed of rotation of motor shaft 10. Control signal voltages in the form of pulses representing the desired shaft speed of rotation are connected to the J and K inputs of flip-flop 90. The pulsed voltage signal on the K input of flip-flop 90 causes the flip-flop to reset at the occurrence of a clock pulse and thereby indicate the normal speed of rotation of motor shaft 10. A pulsed voltage signal to the J input of flip-flop 90 causes the flip-flop to set at the occurrence of a clock pulse and thereby indicate the slew or high speed of rotation of motor shaft 10.

J/K flip-flop 94 of pulse logic circuit 32 responsive to pulsed control voltages at its J and K inputs indicates the desired direction of rotation of the motor shaft. A pulsed input representing reverse rotation of the motor shaft on the J input of flip-flop 94 causes the flip-flop to set whereas a pulsed input on the K input of flip-flop 94 represents forward rotation of the shaft and causes the flip-flop to reset.

The clock pulses for flip-flops 90 and 94 are derived from frequency dividing network 93 which divides the output of oscillator 28 by a dividing factor of $N_6$. For a typical application such as in rotating the solar array of a geo-stationary satellite, the output frequency of oscillator 28 is in the order of 128 kHz and $N_6$ is 160. Flip-flops 90 and 94 thus represent respectively the speed and direction of rotation of motor shaft 10.

Forward motion of the motor shaft 10 is caused by periodically deleting a pulse from the output 25 of pulse phase shifting circuit 26. Reverse motion of the motor shaft is caused by periodically adding a pulse to the output 25 of phase shifting circuit 26. To obtain a forward or reverse fast speed of rotation of the motor shaft, deleting or adding respectively of pulses is proportionally more frequent than for forward or reverse normal motor shaft speed of rotation.

When the motor shaft 10 is to be rotated at the normal speed in either the forward or reverse direction, flip-flop 90 is reset and therefore, the output of frequency divider 98 is connected through AND gate 96 to frequency divider 102. Frequency divider 98 divides the input 34 from oscillator 28 (FIG. 1) by a dividing factor of $N_2$. The output of AND gate 96 is further divided by frequency dividing network 102 by a dividing factor of $N_3$. Therefore when motor shaft 10 is to be rotated at the normal speed of rotation in either the forward or reverse direction the frequency of the output voltage of NOR gate 106 is equal to the frequency of the output voltage of oscillator 28 divided by $N_2 N_3$.

When motor shaft 10 is to be rotated at the fast (slew) speed in either the forward or reverse direction, flip-flop 90 is set and the output of frequency dividing network 98 is connected through AND gate 100 to frequency divider 104. Frequency divider 104 further divides the output of gate 100 by a factor of $N_4$. Therefore, when motor shaft 10 is to be rotated at the fast rate of rotation, the frequency of the output voltage 107 of NOR gate 106 is equal to the frequency of the voltage of oscillator 28 divided by $N_2N_4$. The frequency of the output voltage of NOR gate 106 is, as will be explained, an indication of the rate at which pulses are added or deleted from the output 25 of pulse phase shifting circuit 26.

When the shaft 10 of motor 12 is to be rotated at the fast speed, pulses are added or deleted from the output 25 of shifting circuit 26 at a higher rate then where the motor shaft 10 is to be rotated at the normal rate of rotation. Therefore, the dividing factor $N_4$ of dividing network 104 must be less than the dividing factor $N_3$ of dividing network 102, as the frequency of the output voltage from gate 106 for the fast rate of rotation must be higher than the output voltage frequency for the normal rate of rotation. For a typical application such as in rotating the solar array of a satellite in a geo-stationary orbit, the output frequency of oscillator 28 is in the order of 128 KHz, $N_2$ is 80,000, $N_3$ is 54 and $N_4$ is 2. In such a typical application the output voltage of NOR gate 106 has a frequency of 0.8 Hz when the motor shaft is to be run at the high rate of rotation and 0.02963 Hz when the motor shaft is to be run at the normal speed of rotation, i.e. the normal speed to rotate shaft 10 once per 24 hours.

As explained above, J/K flip-flop 94 indicates the desired direction of rotation of motor shaft 10. When the motor shaft is to be rotated in the forward direction, flip-flop 94 is reset and pulses are deleted at the output 25 of shifting circuit 26. When flip-flop 94 is set, this indicates that the motor shaft is to be turned in the reverse direction and pulses are added to the output 25 of shifting circuit 26.

The addition or deletion or pulses from the output 25 of pulse shifting circuit 26 is accomplished by J/K flip-flops 114, 122, 124 and their associated logic circuitry. The state of the flip-flops 114, 122 and 124 can be represented as a octal number having a value of zero to seven, where the particular value depends upon which of flip-flops 114 (LSB), 122, 124 (MSB) are set or reset. For example, when flip-flops 114 and 124 are both set and flip-flop 122 is reset the state of the flip-flops is represented by the decimal number five.

The output signal voltage from oscillator 28 is connected by path 35 to the clock inputs of each of flip-flops 114, 122 and 124. The operation of the pulse adder/deleter portion of shifting circuit 26 illustrated in FIG. 2 will now be described in detail.

When the motor shaft 10 is to be rotated in the forward direction indicated and with a high voltage output signal of NOR gate 106, flip-flops 114, 122 and 124 change from states six to zero and zero to six on successive clock pulses from oscillator 28. As the flip-flops alternate between states zero and six on successive clock pulses an output is obtained from NAND gate 128 only during state six. Under these conditions, the output signal voltage from NAND gate 128 has a frequency of one-half of the clock frequency from which no deletion of pulses for a high signal voltage out of NOR gate 106 occurs while the voltage remains high.

When the output signal voltage of NOR gate 106 goes low, the states of flip-flops 114, 122 and 124 change causing a pulse to be deleted from the output of shifting circuit 26. More particularly, if at the time the output voltage of gate 106 changes from a high to a low, flip-flops 114, 122, 124 are in state zero, the flip-flops go to state six where an output pulse is obtained from gate 128. Through control logic gates 118, 120 and 126 the flip-flops then go through states one and five where there is no output pulse. Flip-flops 114, 122 and 124 on the next clock pulse then go to state seven where an output pulse is obtained from NAND gate 128. Thereafter on successive clock pulses the flip-flops alternate between states three and seven with an output pulse occurring in state seven and no output pulse occurring in state three. The absence of an output pulse during states one and five has caused a pulse thus to be deleted in the output of phase shifting circuit 26. The rate at which pulses are deleted for forward rotation of motor shaft 20 is dependent upon the frequency of the output signal voltage of NOR gate 106.

When motor shaft 20 is to be rotated in the reverse direction, the addition of pulses to the output of phase shifting circuit 26 is controlled by NAND gate 116. For reverse rotation of the motor shaft, flip-flop 94 is set and therefore enables NAND gate 116. With the output signal of NOR gate 106 high, flip-flops 114, 122 and 124, as explained above for the forward direction of rotation, alternate between states zero and six on successive clock pulses. When the output of NOR gate 106 goes low, a pulse is added to the output 25 of shifting circuit 26. As explained above for the forward direction of shaft rotation, when the output of NOR gate 106 shifts from a high signal voltage to a low signal voltage, flip-flops 114, 122 and 124 go through states one and five to reach state seven. For the reverse rotation of motor shaft 10, when the flip-flops reach state five, NAND gates 116 and 126 allow an output pulse from NAND gate 128, thereby adding one pulse to the output of shifting circuit 26. The rate at which pulses are added to the output of shifting circuit 26 when motor shaft 10 is to be rotated in the reverse direction is dependent upon the frequency of the output signal voltage from NOR gate 106. As explained above for operation in the forward direction of rotation, NAND gate 128 functions to divide the frequency of the clock signal by two.

The output signal voltage from NAND gate 128 is connected by path 37 to frequency divider 36. Divider 36 divides the frequency of the signal voltage by a factor of $N_5$ such that the total frequency division provided by NAND gate 128 and divider 36 is equal to the frequency division provided by two phase drive system 20. Therefore the frequency of the resolver output voltage and the frequency of the output signal voltage from the pulse phase shifting circuit 26, both of which are inputs to phase detector 24 are identical when shaft 10 is rotated at the required speed. The deletion or addition of a pulse from the output signal voltage of shifting circuit 26 causes the phase of that output signal to shift relative to the phase of output signal from oscillator 28.

An example of a suitable two phase drive system 20 (FIG. 1) for providing two orthogonal drive signals, at a frequency of 400 Hz provides for the magnitude $N_1$ of frequency divider 42 to be 80. The frequency divider output signal conducted to phase splitter 44 along conductive path 47 is 1,600 Hz when the oscillator 28 signal is 128 KHz. The signal on conductive path 18 lags the signal on conductive path 16 by one-quarter period of the fundamental frequency of 400 Hz. Thus, the signals on conductive paths 16 and 18 are in phase quadrature and comprise a two phase system. An example of a suitable phase splitter circuit is described in the aforementioned Goldberg patent.

Several equations for determining the system operation are also described in the aforementioned Goldberg patent. From these equations, the shaft speed angle $\theta$ in degrees per second, the shaft angle incremented motion $\Delta\theta$ in degrees per step and the shaft speed $\theta_m$ in revolutions per second can be computed. In a typical system designed utilizing the present invention, where the frequency of oscillator 28 is 128 kHz, resolver 14 and motor 12 were selected to each have 16 poles and where the magnitude of the frequency division provided by the speed control circuit 30 of pulse phase shifting 26 is 4,320,000 for normal shaft rotational speed and 160,000 for slew (fast) shaft rotational speed the values of $\theta$, $\Delta\theta$ and $\theta_m$ are tabulated in Table I below.

| Speed of Shaft | $\theta$ (degrees/ second) | $\Delta\theta$ (degrees/ step) | $\theta_m$ (revolution/ second) |
|---|---|---|---|
| Normal | $4.166 \times 10^{-3}$ | $1.406 \times 10^{-1}$ | $1.157 \times 10^{-5}$ |
| Slew | $1.125 \times 10^{-1}$ | $1.406 \times 10^{-1}$ | $3.125 \times 10^{-4}$ |

The transfer function G(S) of shaping network 68 may be determined by using a computerized model of the phase locked servo drive. In a typical application where motor 12 rotates the solar array of an orbiting spacecraft the input parameters used in this computer model are the system bandwidth, the spacecraft and array moments of inertia and various system nonlinearities. The lower limit of the system bandwidth is determined by internal motor disturbances such as cogging torque and coulomb friction. Cogging torque is the variation in motor torque at very low speeds caused by variations in magnetic flux due to the alignment of the rotor and stator of the motor at various positions of the rotor. The upper limit of the system bandwidth is determined by the resonant frequency of the solar array which is the second torsional mode of the array. The system nonlinearities considered are coulomb friction, the motor torque constant, the resonant frequencies of the array drive and associated spacecraft structure and the saturation limits of the array drive electronics.

The gain and phase relationship of the transfer function G(S) are then placed into the computer model. The gain and phase of shaping network 68 are then varied in order to determine a network frequency response which gives rise to a stable closed loop system.

The computer model shows that where the motor is used to drive the solar array of an orbiting spacecraft as described above the transfer function G(S) is determined by the equation:

$$G(S) = \frac{K(\tau_1 S + 1)(\tau_2 S + 1)}{(\tau_3 S + 1)(\tau_4 S + 1)(\tau_5 S + 1)}$$

where K is a constant of proportionality equal to 5.03 and
$\tau_1 = 0.085$ seconds
$\tau_2 = 1.0$ seconds
$\tau_3 = 0.023$ seconds
$\tau_4 = 0.004$ seconds
$\tau_5 = 0.1$ seconds
and S is the Laplace operator.

A motor speed control system has been described including a specific embodiment using a speed control loop providing high precision control by digital logic circuits of the motor speed. It should be appreciated that the described embodiment wherein pulse phase shifter 26 comprises a combination of clocked J/K flip-flops to provide pulse deletion or addition for an oscillator generated pulse train, and phase splitter 44 comprising logic elements is by way of example. Other elements providing the function of a time varying phase shifter 26 and phase splitter 44 may be used to implement the invention. Thus, many other arrangements can readily be devised in accordance with the disclosed principle of the invention by those skilled in the art.

What is claimed is:

1. A system for controlling the rate and direction of shaft rotation of a bidirectional brushless D-C motor having first and second control coils in response to a source of reference clock pulses, comprising:
    a. means responsive to said reference pulses for generating first and second output signals, said first and second signals being in phase quadrature;
    b. resolver means having a shaft directly coupled to said motor shaft for generating an output signal having a constant amplitude and a phase equal to the product of the number of resolver pole pairs and the angle of said resolver shaft;
    c. phase shift means responsive to said reference clock pulses and a plurality of control signals for generating an output signal having a phase which varies as a function of time, said control signals indicative of shaft rate and direction of rotation;
    d. phase detection means responsive to said resolver means output signal and said phase shifting means output signal for generating an output signal having an amplitude equal to the phase difference between said resolver means and phase shifting means output signals;
    e. modulation means having an output and first and second inputs thereof; said first input being coupled to the output of said detector means and said second input being coupled to the output of said resolver means;
    f. first demodulation means responsive to said modulation means output signal and said first output signal for generating an output signal to energize said first motor control coil, and
    g. second demodulation means responsive to said modulation means output signal and said second output signal for generating an output signal to energize said second motor control coil; thereby commutating said motor coils.

2. A system according to claim 1 further including first amplifying means responsive to said first demodulation means output signal for modifying said signal as applied to said first motor control coil, and second amplifying means responsive to said second demodulation means output signal for modifying said signal as applied to said second motor control coil.

3. A system according to claim 1 further including shaping means responsive to said phase detection means output signal for coupling said signal to said first input of said modulation means.

4. A system according to claim 3 further including filtering means responsive to said phase detection means output for modifying said signal as applied to said shaping means.

5. A system for controlling the rate and direction of shaft rotation of a brushless D-C motor having first and second control coils in response to a source of reference clock pulses, said motor shaft adapted for rotation in first and second directions comprising:
    a. two phase drive means including phase splitter means responsive to said reference pulses for generating first and second output signals, said first and second signals being in phase quadrature;

b. resolver means having a shaft directly coupled to said motor shaft responsive to said first and second phase drive means output signals for generating an output signal having a constant amplitude and a phase equal to the product of the number of resolver pole pairs and the angle of said resolver shaft;

c. phase shift means responsive to said reference clock pulses and a plurality of control signals for generating an output signal having a phase which varies as a function of time, said control signals indicative of shaft rate and direction of rotation;

d. phase detection means responsive to said resolver means output signal and said phase shifting means output signal for generating an output signal having an amplitude equal to the phase difference between said resolver means and phase shifting means output signals;

e. modulation means having an output and first and second inputs thereof; said second input being coupled to the output of said resolver means;

f. shaping means coupling the output of said phase detector to said first input of said modulation means;

g. first demodulation means responsive to the modulation means output signal and said two phase drive means first output signal for generating an output signal to energize said first motor control coil, and h. second demodulation means responsive to said modulation means output signal and said two phase drive means second output signal for generating an output signal to energize said second motor control coil; thereby commutating said motor coils.

6. A system according to claim 5 wherein said phase shifting means further includes second means to periodically delete pulses from said reference pulses at one or more predetermined rates to rotate said shaft in said first direction.

7. A system according to claim 5 wherein said phase shifting means further includes third means to periodically add pulses from said reference pulses at one or more predetermined rates to rotate said shaft in said second direction.

8. A system according to claim 5 wherein said two phase drive means further includes signal dividing means through which said reference pulses are applied to said phase splitting means; and filtering means responsive to said phase detector output signal for modifying said signal as applied to said shaping means.

9. A system according to claim 5 further including first amplifying means responsive to said first demodulation means output signal for modifying said signal as applied to said first motor control coil, and second amplifying means responsive to said second demodulation means output signal for modifying said signal as applied to said second motor control coil.

* * * * *